United States Patent [19]

Scheneman, Jr.

[11] Patent Number: 4,723,646
[45] Date of Patent: Feb. 9, 1988

[54] ADJUSTABLE ROLLER BRAKE

[76] Inventor: Herbert T. Scheneman, Jr., P.O. Box 437, Fenton, Mich. 48430

[21] Appl. No.: 929,269

[22] Filed: Nov. 10, 1986

[51] Int. Cl.$^4$ .......................................... B65G 13/075
[52] U.S. Cl. ................................... 193/35 A; 188/83
[58] Field of Search ............... 193/35 A; 188/83, 72.2

[56] References Cited

U.S. PATENT DOCUMENTS

| 1,971,515 | 8/1934 | Transue | 188/83 |
| 2,560,015 | 7/1951 | Waldron | 188/83 X |
| 3,899,063 | 8/1975 | Pollard | 193/35 A |

Primary Examiner—Jeffrey V. Nase
Assistant Examiner—James M. Kannofsky
Attorney, Agent, or Firm—Cullen, Sloman, Cantor, Grauer, Scott & Rutherford

[57] ABSTRACT

An adjustable brake for a conveyor roller formed of a tube mounted upon a coaxial shaft extending through a support hub includes a resilient washer-like pad on the end face of the roller, a similar pad on the adjacent hub face and a series of balls compressed between the pads. The end of the shaft extends outwardly of the hub, through a conveyor support rail, and threadedly engages a nut. Adjustment of the nut adjustably presses the support hub towards the roller end to adjustably squeeze the balls between the rings. The balls resiliently compress the portions of the rings that they contact to embed into the ring surfaces and form momentary depressed sockets in the ring surfaces. Rotation of the roller relative to the support hub causes rotation of the balls and corresponding displacements of the depressed sockets which produces resilient resistive forces upon the balls to retard the speed of rotation of the roller.

9 Claims, 5 Drawing Figures

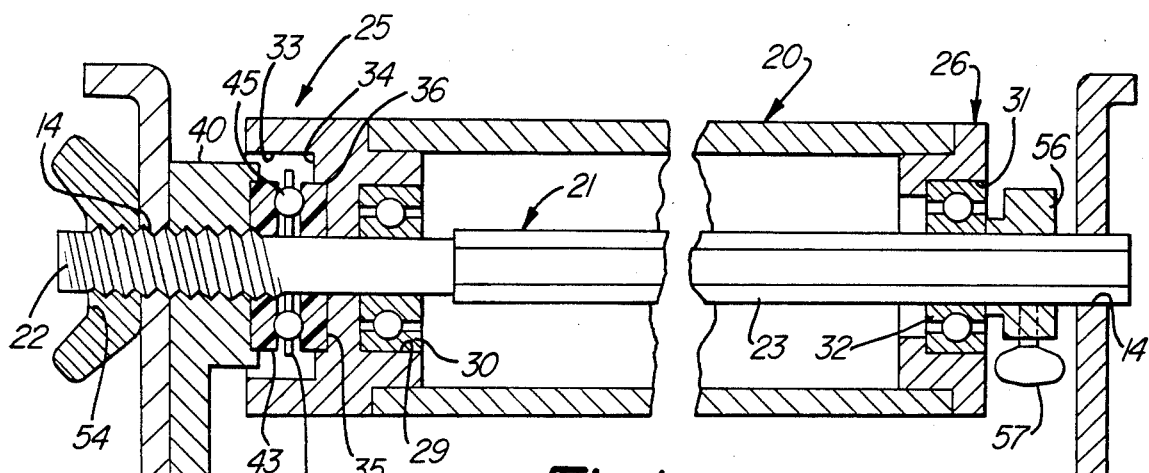
*Fig-1*
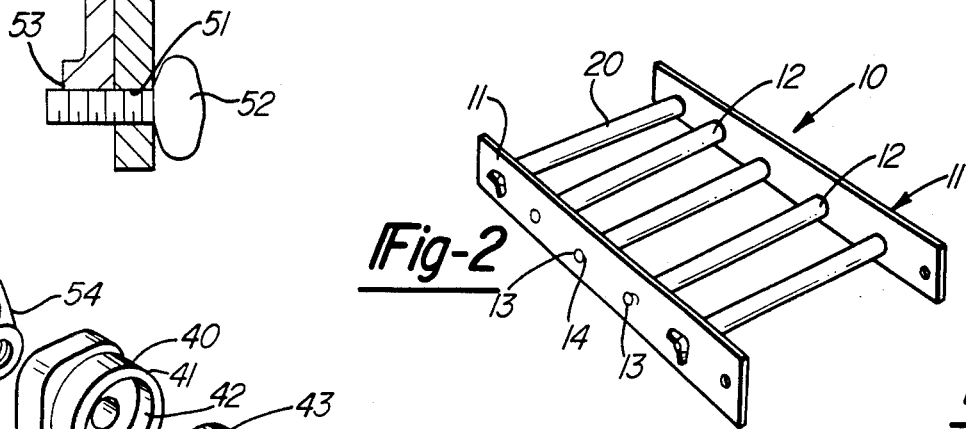
*Fig-2*
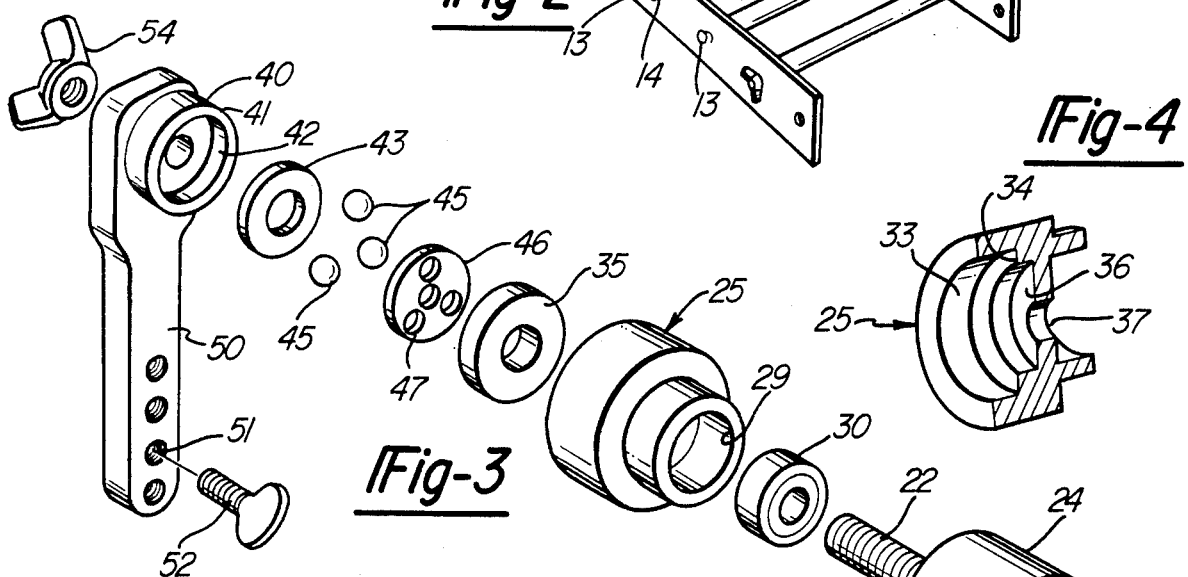
*Fig-3*
*Fig-4*
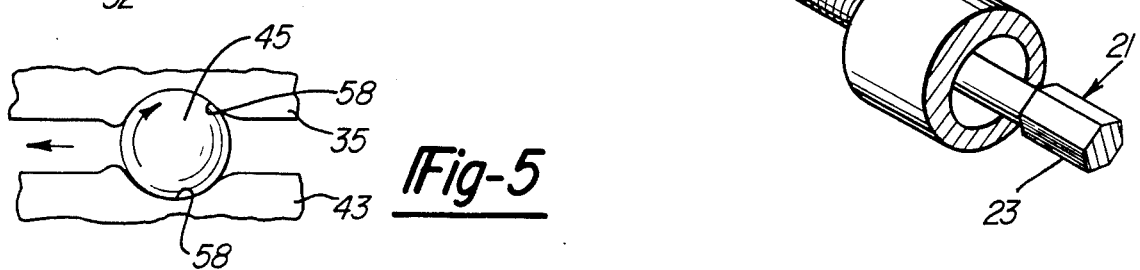
*Fig-5*

ADJUSTABLE ROLLER BRAKE

BACKGROUND OF INVENTION

Roller conveyors which are used in factories, warehouses, and other places for moving objects, typically comprise a pair of parallel frame members or rails and a large number of parallel, elongated, rotatable rollers that extend across the space between the rails. Objects to be moved are placed upon the rollers and if the roller conveyor is tipped slightly relative to the horizontal, the weight of the object to be moved results in the object moving along the length of the conveyor as the rollers rotate. In some instances, power means may be provided to assist the force of gravity in moving the object upon the roller conveyor.

In many places, particularly where a conveyor is sufficiently pitched or angled relative to the horizontal to cause the conveyed object to move rapidly along its length, it is desirable to provide braking means to retard or to gradually stop the movement of the object along the conveyor. For that purpose, it is desirable to provide a braking means which controllably slows the rotation of selected rollers in a roller conveyor to resist the gravity-assisted free movement of the objects moved upon the conveyor.

Since roller conveyors are ordinarily simple mechanisms, requiring little maintenance and are generally regarded as inexpensive items of equipment, it is important that any mechanism used with such conveyors for retarding the speed of movement of conveyed objects be relatively simple in construction, inexpensive and essentially trouble-free.

The invention herein relates to rollers embodying brake mechanisms, which rollers may be used in roller conveyors for retarding the speed of rotation of the braked rollers. Such rollers, thereby, by their frictional engagement with the conveyed objects, slow the movement of such objects to desired rates.

SUMMARY OF INVENTION

The invention herein relates to a conveyor roller of the type having a shaft carrying a surrounding elongated roller tube and a braking mechanism to retard the speed of rotation of the roller tube. The braking mechanism essentially comprises a plug-like closure fitted into one end of the tube and surrounding the shaft, with a resiliently depressable, rubber-like plastic washer or pad mounted upon the exposed surface of the plug, coaxially with the shaft. A hub having a face opposing the plug carries a similar washer or pad which is closely spaced from the first washer. The hub may be fixed against rotation by a suitable connection to a fixed portion of the conveyor, such as the conveyor rail.

Between the two washers, a series of ball bearing elements, which are held by a suitable cage in predetermined, radially spaced apart, positions, is squeezed between the washers. By moving and fixing the position of the hub relative to the plug, the space between the washers can be adjusted so that the pressure of the squeeze upon the balls can be predetermined.

The balls embed, to a limited degree, within the adjacent resilient washers or to form temporary or momentarily produced depressions or sockets. Hence, as the tube, with the end plug, rotates relative to the hub, the balls move in a circular path between the resilient pads in much the same way as a boat moves through water, i.e. displacing the pad material as they traverse the pads. The displacement of the material produces resistive forces which impede or retard rotation and consequently, provide the braking force of the roller.

Since a typical roller conveyor comprises numerous, elongated rollers arranged in parallelism, side-by-side and extending between a pair of support frames, it is only necessary to use a limited number of braking rollers, with the remaining rollers being free for rotation, to brake an object rolling along the conveyor. For example, by utilizing a braking roller for every fourth or sixth roller, the frictional contact between the braking roller and the object being moved (e.g. a carton box containg some object), slows the movement of the box along a downwardly angled roller conveyor to predetermined rates. The use of more rollers of the braking type and especially increasing the amount of braking force of the rollers near the location where movement of the object is to be stopped, such as near the end of the conveyor, permits adjusting the rollers so as to move an object rapidly and thereafter, slow the movement to the point where the object will stop at a predetermined position.

This braking roller includes a simple manual adjustment to produce the required braking force. Once that force is set, the roller is essentially left alone. Thus, the simple, inexpensive construction of the braking rollers of this invention provides rollers which require virtually no maintenance, are essentially trouble free and can be easily set and adjusted with non-skilled labor.

One object of this invention is to provide braking rollers which can be sold individually for installation on pre-existing roller conveyors when these conveyors are used in a way where retarding the movement of the conveyed object is desirable. That is, such rollers can be purchased, independently of a conveyor, and installed and used in an existing conveyor to the extent necessary and removed when unnecessary.

One significant object of this invention is that the brake mechanism is, for all practical purposes, unaffected by grease, oil, dirt or other foreign objects because the braking force is obtained through the resilient depressing or squeezing of rubbery, plastic washer-like pads whose actions are substantially unaffected by foreign materials. Thus, this type of conveyor roller is particularly useful in locations where the ambient conditions are relatively hostile with respect to oil, dirt, grease and other similar foreign materials.

These and other objects and advantages of this invention will become apparent upon reading the following description, of which the attached drawings form a part.

DESCRIPTION OF DRAWINGS

FIG. 1 is a cross-sectional, elevational view of a roller brake mounted upon a roller conveyor frame.

FIG. 2 is a perspective view, to a smaller scale, showing a small portion of a typical roller conveyor utilizing the roller brake.

FIG. 3 is a perspective, disassembled view of the elements forming the roller brake.

FIG. 4 is a perspective, cross-sectional view, to an enlarged scale, of the roller end plug or cap.

FIG. 5 is an enlarged, schematic view, showing the movement of one of the balls relative to the opposing resilient pads.

DETAILED DESCRIPTION

FIG. 2 schematically illustrates, in perspective, a typical roller conveyor 10. The conveyor includes a pair of side rails 11 which are rigidly supported, as for example, upon legs resting upon a floor surface. A large number of conventional rollers 12 span the space between the spaced apart rails 11. The conventional conveyor rollers have spindles 13 on their ends, which spindles extend through holes 14 formed in the rails. These rollers may be of a type having external, tubular sleeves that are rotatably mounted upon the spindles.

In usual roller conveyor operations, the conveyor is tipped downwardly a slight amount relative to the horizontal. Objects to be conveyed, such as boxes, broad-based articles, etc., are positioned upon the rollers and, because of the force of gravity, these objects move downhill along the rollers. Where the conveyors extend long distances, the speed of movement of the objects can build up to an excessive amount and, thus, some sort of mechanism is needed to slow them down and to stop them. Frequently, the objects are stopped by a fixed bumper or stop mechanism into which the object crashes, with each succeeding object banging into the object preceding it. In many types of operations, the impacts of stopping the objects are not important. However, for some kinds of objects, particularly large objects or delicate objects, the impact is significant and it is desirable to slow down the rate of speed of movement of the object along the conveyor. For that purpose, the brake mechanism of this invention is to be used.

The braking mechanism of this invention is in the form of braking rollers 20 which may be substituted for some of the conventional rollers 12 of a roller conveyor. For example, as shown in FIG. 2, a braking roller is used after each three conventional rollers, although the number of braking rollers may be varied considerably depending upon the roller conveyor and the objects to be moved.

The braking rollers 20 include a shaft 21 which has a threaded end 22 and an irregularly, e.g. hex-shaped, end 23. The two ends extend through the typical spindle holes 14 in the conveyor side rails 11. In this instance, the holes are shown to be in hexagonal shapes for receiving the shaft ends 23 and fixing them against rotation.

Each roller includes a roller tube 24 which is coaxial with and extends substantially the full length of the shaft. The roller tube has a brake end plug or cap 25 which is centrally bored to receive the adjacent end portion of the shaft. The opposite end of the roller has an opposite end plug or cap 26 which is similarly bored for passage of the shaft.

The inner face or end of the brake end plug 25 is provided with a socket or depression 29 which may receive a ball or roller bearing 30 that rotatably mounts the tube upon the shaft. Likewise, the opposite end plug 26 is provided with a socket 31 which receives a similar ball or roller bearing 32 mounted upon the shaft. These ball or roller bearings are of any suitable conventional type.

The exposed or open end of the brake end plug 25 is provided with an endwise opening socket 33. This socket forms a base or end face 34 (see FIG. 4) against which a flat, washer-like ring or pad 35 is positioned in an annular groove 36 formed in the base. A central hole 37 in the base provides a passageway for the shaft 21.

A support hub 40 is located adjacent the plug socket 33. This hub is provided with an end face 41 which is normally spaced a short distance from the base 34 of the end plug 25. A groove 42 formed in the hub end face 41 seats a washer-like pad or ring 43 which is similar to the ring 35.

The two washers or pads are formed of a rubber-like, plastic material, as for example, a polyurethane which is characterized by being rubbery or resiliently compressible and rapidly, resiliently recovers from compression.

A series of roller elements in the form of metal balls 45 are positioned between the two adjacent pads or washers. The balls are held in radially spaced apart positions by a retainer plate 46 that has holes 47, each of which receives one of the balls. For example, three balls may be used, as illustrated in FIG. 3, with each ball fitted within a hole 47 and squeezed between the two opposed pads 35 and 43.

The support hub is provided with an arm or extension 50 having a threaded hole 51 through which a thumb screw 52 is engaged. The arm 50 extends below the conveyor rail 11 so that the screw 52 engages the lower edge 53 of the rail to prevent rotation of the arm 50 and the support hub to which it is attached.

A suitable wing nut 54 is provided on the threaded end 22 of each of the roller shafts. The opposite end of the shaft has a circular retainer collars 56 which are secured in position upon the shaft by means of a thumb set screw 57.

In operation, an ordinary roller may be removed from the roller conveyor and a brake roller of this invention can be substituted. One end of the brake roller, extending through the rail opening 14, is fixed against rotation due to the interengagement of the hex-shapes. The other end of the shaft extends through the opposite opening 14 and is held in place by the wing nut 54.

The roller tube is rotatably mounted upon the shaft and is prevented from shifting in one direction by the retainer collar 56. Now, the brake may be manually adjusted by turning the wing nut 54 a small amount. The wing nut pressure forces the hub into closer proximity with the end plug or cap, thereby more tightly squeezing the balls between the opposed resilient pads.

To ensure good contact between the roller surface and the supported object, the roller surface may be knurled or may be coated with a resilient, rubber-like coating, such as a commercially available urethane coating. This substantially increases the coefficient of friction of the roller surface. In addition, the brake roller may be made slightly oversize, e.g., 0.01–0.02 inches, as compared with the other rollers already on the particular conveyor involved to enhance contacting the supported object.

The metal balls depress the portions of the pads against which they are contacted to momentarily form temporary sockets or depressions, as illustrated schematically in FIG. 5. These momentary depressions 58 are displaced or moved as the balls traverse a circular path during relative rotational movement between the roller tube and the hub. The movement of the balls upon the surfaces of the pads is somewhat analogous to the movement of a boat through water, giving a wave-like configuration to the surfaces of the pads to provide substantial resistive forces that resist the movement of the balls. Consequently, the resistive forces retard the rotation of the roller tube.

Since varying the retarding forces come from varying the depths of the depressions and the resilient resistance to the rotative movement or displacement of the depressions in the pad material, the retardation effect is substantially independent of the surface conditions of the pads. That is, oil, grease and dirt will have little, if any effect, upon normal operation of the brake.

As many roller brakes may be used as is appropriate for any particular roller conveyor merely by substituting a roller brake for a conventional roller in the conveyor. By sequentially adjusting the braking retardation forces, an object moved upon the conveyor may be gradually slowed down or stopped because of the frictional contact between the object and the roller brakes which resist turning due to the braking forces. Once the braking forces are preset manually, they can remain substantially unchanged for as long as desired. However, they can be easily reset merely by turning the thumb screws 54 in one direction or the other to either tighten or loosen the hubs relative to the tube and plugs. A small amount of movement of the thumb screws will adjust the braking force.

This invention may be further developed within the scope of the attached claims.

Having fully described an operative embodiment of this invention, I now claim:

1. An adjustable roller brake for retarding the speed of axial rotation of a conveyor roller comprising:
   a ring-washer shaped roller pad positioned upon a face of one end of the roller, with the pad being coaxial with the roller;
   a support hub having a transverse face parallel to and spaced a short distance apart from said roller face, and with the roller and support hub being relatively rotatable;
   a ring-washer shaped hub pad positioned upon said transverse face, coaxial with the roller and parallel to, but spaced from, the roller pad;
   said pads being formed of resiliently depressable plastic material;
   a series of bearing elements arranged between, and in contact with, the pads and a retainer holding the elements in angularly spaced apart relationship coaxially of the roller;
   adjustable pressure means for pressing the roller and hub faces together and holding said faces in selectively determined spaced apart relationship so that the bearing elements are squeezed between and are normally partially imbedded within the pads which resiliently compress to received the elements in momentarily formed socket-like depressions;
   whereby relative rotation of the roller and support hub causes the bearing elements to traverse the pads in a circular path, which is coaxial with the roller, and the locations of the momentary socket-like depressions in the pads continually change with the movement of the embedded bearing elements so as to exert a resistive force upon the bearing elements which retard their rotation around the roller axes and thereby, retard rotation of the roller, and with the amount of retardation of the roller being controlled by the adjustment of the pressure means.

2. An adjustable roller brake as defined in claim 1, and said bearing elements being formed of ball bearing-like metal spheres, and the retainer being formed of a flat plate having spaced apart holes within which the spheres are positioned.

3. An adjustable roller brake as defined in claim 1, and said roller face being the base of a depressed socket formed in the end of the roller;
   said support hub being shaped to fit into the socket;
   and said pads respectively fitted within annular grooves formed in the roller face and support hub face.

4. An adjustable roller brake as defined in claim 3, and including an arm fixed to the support hub and immovably engaged with an adjacent fixed conveyor portion, so that the hub is held against the rotation.

5. An adjustable roller brake as defined in claim 4, and including a shaft extending coaxially through the roller, with one end of the shaft extending through the socket and hub and terminating in a threaded end portion; and a nut threadedly engaged with the shaft threaded end portion for forming the adjustable pressure means.

6. An adjustable roller brake as defined in claim 4, and said roller being formed of a hollow tube, and said socket being formed in a centrally bored plub that closes the end of the tube and surrounds the adjacent shaft portion.

7. An adjustable roller brake for retarding the rotational speed of a conveyor roller formed of a central support shaft surrounded by a roller tube, comprising:
   one end of the tube being closed by a centrally bored plug portion through which the shaft extends, with a depressed socket formed in the plug and having a base;
   a first annular, washer-like ring positioned upon the base, surrounding the shaft, with the ring being formed of a resilient, rubber-like plastic material;
   a support hub having an end face extending into the socket, and arranged parallel to, but space from the socket base;
   a second, annular, washer-like ring formed of similar material as the first ring, and carried upon the end face and arranged parallel to the first ring;
   a series of angularly spaced apart balls located between the rings and held in relative position by a retainer;
   an end portion of the shaft extending outwardly of the support hub and being threadly engaged with a nut, so that turning the nut upon the threaded shaft end presses the support hub towards the socket base for compressing the balls between the rings to form temporary depressions within which the balls are seated;
   whereby rotation of the roller relative to the support hub produces movement of the balls and radial displacement of the depressions in which they are seated to produce a resilient force in the rings which resist rotation, with the amount of resistance controlled by the tightening and loosening of the nut.

8. An adjustable roller as defined in claim 7, and including an arm fixed to the support hub and immovably secured to an adjacent fixed support for holding the hub against a rotation.

9. An adjustable roller brake as defined in claim 8, and including means for holding the shaft against rotation, with the tube being rotatably mounted upon the shaft, and a stop means for limiting the axially longitudinal movement of the tube relative to the shaft in the direction away from the hub.

* * * * *